(12) United States Patent
Krieger

(10) Patent No.: US 10,807,337 B2
(45) Date of Patent: Oct. 20, 2020

(54) DRIVE FOR A MACHINE, TORQUE MOTOR, CLUTCH UNIT, DEVICE FOR PROCESSING MATERIALS, AND USE OF A TORQUE MOTOR

(71) Applicant: SMS GROUP GmbH, Duesseldorf (DE)

(72) Inventor: Willhelm Krieger, Odenthal (DE)

(73) Assignee: SMS GROUP GMBH, Duesseldorf (DE)

( * ) Notice: Subject to any disclaimer, the term of this patent is extended or adjusted under 35 U.S.C. 154(b) by 622 days.

(21) Appl. No.: 15/508,311

(22) PCT Filed: Sep. 1, 2015

(86) PCT No.: PCT/EP2015/069937
§ 371 (c)(1),
(2) Date: Mar. 2, 2017

(87) PCT Pub. No.: WO2016/037898
PCT Pub. Date: Mar. 17, 2016

(65) Prior Publication Data
US 2017/0246825 A1  Aug. 31, 2017

(30) Foreign Application Priority Data

Sep. 8, 2014 (DE) .................. 10 2014 217 918
Nov. 5, 2014 (DE) .................. 10 2014 222 592

(51) Int. Cl.
*B30B 1/26* (2006.01)
*H02K 26/00* (2006.01)
(Continued)

(52) U.S. Cl.
CPC .............. *B30B 1/266* (2013.01); *B30B 1/261* (2013.01); *F16D 3/04* (2013.01); *H02K 7/003* (2013.01);
(Continued)

(58) Field of Classification Search
CPC ... B25J 19/0004; B25J 9/1025; B30B 11/188; B30B 11/26; B30B 11/261;
(Continued)

(56) References Cited

U.S. PATENT DOCUMENTS 4,398,110 A  8/1983  Flinchbaugh
4,577,127 A  3/1986  Ferree
(Continued)

FOREIGN PATENT DOCUMENTS

CN  2266114 Y  10/1997
CN  102248691 A  11/2011
(Continued)

*Primary Examiner* — Tulsidas C Patel
*Assistant Examiner* — Rashad H Johnson
(74) *Attorney, Agent, or Firm* — Andrew Wilford

(57) ABSTRACT

The invention relates to a drive (1; 101) of a machine (2) comprising a drive motor (3) for driving a rotatable shaft (5) of the machine (2) around a shaft axis of rotation (4), and comprising a clutch unit (10) in operative connection with the drive motor (3) and the shaft (5) for compensating for a relative movement (11) between the shaft (5) and the drive motor (3). The drive motor (3) has a rotor part (35) surrounding the shaft (5) on which a clutch rotation part (18A) of the clutch system (10) is mounted to be rotatable around the shaft axis of rotation (4), wherein the rotor part (35) is arranged at least partially engaging in the clutch rotation part (18A) in such a way that the clutch rotation part (18A) is mounted radially movably on the rotor part (35).

17 Claims, 3 Drawing Sheets

(51) Int. Cl.
*H02K 7/00* (2006.01)
*F16D 3/04* (2006.01)
*B25J 9/10* (2006.01)
*B25J 19/00* (2006.01)
*B30B 1/18* (2006.01)
*H02K 16/04* (2006.01)
*H02K 49/10* (2006.01)
*H02K 51/00* (2006.01)

(52) U.S. Cl.
CPC .............. *H02K 26/00* (2013.01); *B25J 9/1025* (2013.01); *B25J 19/0004* (2013.01); *B30B 1/188* (2013.01); *B30B 1/26* (2013.01); *H02K 16/04* (2013.01); *H02K 49/10* (2013.01); *H02K 49/108* (2013.01); *H02K 51/00* (2013.01)

(58) Field of Classification Search
CPC ......... B30B 11/266; F16D 3/04; H02K 16/04; H02K 26/00; H02K 49/10; H02K 51/00; H02K 7/003
USPC ................... 310/80, 83, 92, 98, 99, 100
See application file for complete search history.

(56) References Cited

U.S. PATENT DOCUMENTS

| | | | | |
|---|---|---|---|---|
| 5,374,028 | A * | 12/1994 | Neubold | F16K 1/42 251/159 |
| 5,917,259 | A | 6/1999 | Stridsberg | |
| 7,530,912 | B2 * | 5/2009 | Kramer | B60K 6/26 475/5 |
| 8,638,013 | B2 * | 1/2014 | Takeuchi | H02K 7/116 310/75 R |
| 2010/0187954 | A1 * | 7/2010 | Kendall | B60K 7/0007 310/67 R |
| 2011/0037306 | A1 * | 2/2011 | Schuler | F16H 1/32 297/353 |
| 2014/0077641 | A1 * | 3/2014 | Ratte | H02K 7/108 310/78 |
| 2017/0184161 | A1 * | 6/2017 | Schmidt | F16D 28/00 |
| 2018/0335127 | A1 * | 11/2018 | Wentz | B60K 17/344 |

FOREIGN PATENT DOCUMENTS

| | | |
|---|---|---|
| DE | 4203931 B | 3/1994 |
| EP | 2489892 A | 8/2012 |

\* cited by examiner

DRIVE FOR A MACHINE, TORQUE MOTOR, CLUTCH UNIT, DEVICE FOR PROCESSING MATERIALS, AND USE OF A TORQUE MOTOR

CROSS REFERENCE TO RELATED APPLICATIONS

This application is the US-national stage of PCT application PCT/EP2015/069937 filed 1 Sep. 2015 and claiming the priority of German patent application 102014217918.1 itself filed 8 Sep. 2014 and German patent application 102014222592.2 itself filed 5 Nov. 2014.

FIELD OF THE INVENTION

The invention relates to a drive of a machine having a drive motor for driving a shaft of the machine that is rotatable about a shaft rotation axis and having a coupling that is operatively connected to the drive motor and the shaft for compensating for a relative movement between the shaft and the drive motor, the drive motor having a rotor surrounding the shaft and on which a rotatable part of the coupling is mounted for rotation about the shaft rotation axis.

The invention also relates to a torque motor, in particular a torque motor comprising a stator and a rotor that can rotate about a rotor rotation axis for driving a shaft.

The invention also relates to a coupling having a coupling hub having a coupling flange and having a coupling disk that can be displaced radially with respect to the coupling flange, where the coupling hub, the coupling flange, and the coupling disk are operatively connected to one another in such a way that the coupling disk is displaceable radially with respect to the coupling flange.

The invention additionally relates to a device for processing materials, in particular a mechanical press or an eccentric press, having a drive for driving a tool, the drive comprising a torque motor and a coupling.

The invention also relates to the use of a rotation body of a torque motor driving a shaft.

BACKGROUND OF THE INVENTION

In particular there are generic drives that are known as direct electric drives of drive shafts of eccentric press drives, connecting link press drives, rollers drives or the like, for example. These may be used on material-forming and/or workpiece-shaping machines.

With these material-forming and workpiece-shaping machines, the drive shafts, i.e. working shafts, are usually mounted with slide bearings in a machine frame. During operation of these forming machines, substantial axle offset, i.e. offset of the drive shaft in the axial direction, but also in the radial direction with respect to the shaft rotation axis may occur due to thermal influences, for example, or due to an operating-related wear on bearing points on the drive shafts and can cause problems when using direct drives with torque motors in particular because such axle offset of direct drives cannot be compensated for directly at all or only inadequately by direct drives due to their design. In order to be able to compensate for such axle offset of the drive shafts to a sufficient extent, a compensating coupling is connected between a drive motor of the direct drive and the drive shaft it drives, leading to a long design length because of the axial arrangement. These compensating couplings assembled from various components are often high maintenance and susceptible to problems because of the extremely high torques they must often deliver.

OBJECT OF THE INVENTION

The object of the present invention is to improve upon generic drives in such a way that at least the disadvantages defined above are overcome.

SUMMARY OF THE INVENTION

The object of the invention is achieved by a drive of a machine with a drive motor for driving a shaft of the machine that rotates about a shaft rotation axis and with a coupling operatively connected to the drive motor and the shaft for compensating for relative movement between the shaft and the drive motor, such that the drive motor has a rotor enclosing the shaft on which a coupling rotary part of the coupling that can rotate about the shaft rotation axis is mounted, the rotor shaft being mounted so that it extends at least partially into the rotatable part of the coupling and the rotatable part of the coupling is mounted to be radially movable on the rotor.

Due to the fact that the rotatable part of the coupling is arranged and/or mounted directly so that it is radially movable on the rotor shaft of the drive motor, bypassing additional coupling components, the present coupling has an especially compact design, so that this coupling in particular and the drive of the machine in general can be designed with reduced components and thus also to be much more compact.

In other words, this means that according to the invention at least one functional component of the drive motor is a function part of the coupling or vice versa, which in turn means that the drive according to the invention can be designed with at least one fewer functional component on the whole. In this way, the coupling and/or the entire drive can be designed to be much more compact and also with a lighter weight, while retaining a corresponding design, and nevertheless an offset of the shaft center, i.e. a shaft offset radially to the shaft rotation axis as well as a shaft offset axially to the access of rotation of the shaft, i.e. in the axial direction of the shaft rotation axis, can be compensated for.

The present machine is for machining and is preferably a workpiece-shaping machine.

The term "drive" in the sense of the present invention thus describes any drive of a machine, for example, eccentric cross drives, connecting link press drives, forging drives, rolling drives or the like of a material forming and/or workpiece-shaping machine in this regard.

In particular, the present drive may be the drive of a drive shaft, in particular a working shaft, of a machine, of a torque motor, or of a coupling.

The present drive is ideally designed as a direct electric drive, i.e. the drive motor is operatively connected to the rotating shaft directly and thus preferably without the intervention of a gear and/or a shiftable transmission. To this extent, the shaft rotates at the same rotational speed as an output element of the drive motor on its output end.

The term "drive motor" in the present case describes specifically torque motors that generate torque, and that can rotate drive shafts and/or working shafts, in particular of a workpiece-shaping machine, i.e. for rotation about an rotation axis. The drive motor is preferably designed as a three-phase synchronous motor with a permanent magnet.

The present drive motor may be a torque motor in particular. Torque motors are known in various forms from the prior art. Due to their high torques, they are excellently suited for rotating drive shafts at relatively low rotational speeds, in particular on workpiece-shaping machines.

The concept "rotor" here describes an output element rotated about an rotation axis of the drive motor, designed, for example, as an annular rotor ring element of the rotor or the like on its output end.

The term "coupling" in the sense of the present invention characterizes compensating couplings that can compensate for axle offset of a drive shaft, for example, axle offset of a material forming and/or workpiece-shaping machine, i.e. drive-shaft offset in the radial direction in particular, based on a corresponding rotation axis of the drive shaft but also in the axial direction.

In particular with the present coupling a balancing coupling as in an Oldham coupling can be used. Oldham couplings have the advantage that they can be angularly true.

The rotatable coupling part in this regard is designed, for example, as a rotationally symmetrical coupling disk or the like.

A particularly preferred variant is that the rotatable coupling part and the rotor together form a connection that carries the rotary rotatable coupling part directly on the rotor in a radially movable but rotationally fixed manner. In this way, the rotatable coupling part and the rotor are operatively connected directly to one another.

It is particularly advantageous if the rotor has at least one coupling dog that engages in a connecting slot formed by the rotatable coupling part. In this way, the rotor may form a functional component of the present coupling in a structurally simple manner, so that the drive may be much simpler in design than previous torque drives of standard forming machines.

The rotor preferably has a coupling dog pair so that a more favorable transfer of torques can be achieved. The rotor may also be designed to be rotationally symmetrical to two symmetrically arranged coupling dogs opposite one another with respect to the access of rotation of the rotor.

If the at least one coupling dog projects axially beyond a front axial end face of the rotor, then the rotor may engage with no problem in a connecting slot created in the rotatable coupling part.

The front axial end face ideally runs at a right angle to the longitudinal extent of the shaft rotation axis.

Furthermore, torques may be transferred advantageously between the rotor and the rotatable coupling part if the at least one coupling dog is arranged at a distance radially from the shaft rotation axis.

To also be able to transfer radial movements of the rotatable coupling part with respect to a coupling part mounted on the shaft, it is advantageous if the rotatable coupling part is operatively connected to a coupling hub of the coupling mounted on the shaft, so that it is radially mobile.

A structurally simple operative connection between the rotatable coupling part and the coupling head part can be established if the rotatable coupling part and the coupling hub are operatively connected to one another by coupling lugs engaging in coupling grooves, and it may be optional whether such connecting slots and coupling lugs are present on the rotatable coupling part and/or on the coupling head part.

The present drive can be designed to be particularly compact when both the drive motor and the coupling are arrayed around the shaft so that the ends of the shaft are exposed. In this way, the two shaft ends in particular are no longer installed through the drive motor and/or through the coupling and are thus freely accessible, so that additional components such as a parking brake, a cam shift mechanism, a rotational angle generator for detecting the rotational angle or the like may be mounted on the two shaft ends.

It is especially advantageous in terms of the design if the rotatable coupling part comprises an Oldham disk of an Oldham coupling and is therefore angularly true.

In addition, the object of the invention is also achieved by a torque motor, in particular a torque motor having a stator and a rotor rotating about a rotor rotation axis, for driving a shaft, and the rotor comprises a first connection part of a connection of a torque motor and the coupling operatively connecting the shaft.

This yields a significantly simplified design of the torque motor with respect to a coupling with a suitably designed coupling because it can be used only when joined to a suitably designed additional connection part.

The structural complexity can be reduced particularly well if the first connection part is a coupling flange of the coupling.

It is particularly advantageous if the rotor is unitarily formed with the first connection part because, in this way, an extremely compact design can be achieved.

It is self-evident that this first connection part may have a variety of designs. This first connection part is preferably a rotor ring element.

The rotor of the present torque motor can be formed in a particularly simple manner if the first connection part comprises at least one axial cam and/or an axial cam groove.

It is especially advantageous if this axial cam and/or axial cam groove and the rotor and/or the rotor ring element are preferably arranged on a diameter that is the same or at least similar because, in this way, the circumferential force may turn out to be relatively low, so that the axial cam and/or axial cam groove can be designed to be small taking into account the surface pressure. This is true in particular in conjunction with the drive described here and specifically with an eccentric press.

A coupling in the sense of the present invention can be integrated very easily structurally into the torque motor if the connection has another connection part that is radially displaceable with respect to the first connection part.

In this way, it is advantageous if the additional connection part comprises an Oldham disk of an Oldham coupling because an Oldham coupling is thus angularly true.

In addition, the object is attained by a coupling with a coupling hub, with a coupling flange and with a coupling disk displaceable radially with respect to the coupling flange, in which the coupling hub, the coupling flange and the coupling disk are operatively connected to one another in such a way that the coupling disk is radially displaceable with respect to the coupling flange, and the coupling flange comprises a rotor, in particular a rotor ring element of the rotor, of a torque motor. In this way, the torque motor in an appropriate design can be integrated at least partially into the coupling.

A particularly advantageous embodiment variant in this regard provides that the coupling flange and/or the rotor forms a bearing seat of a roller bearing or slide bearing of the torque motor that rotationally connects the coupling flange on a housing of the torque motor so that the coupling and the torque motor can be merged into one piece very easily.

The coupling flange advantageously includes at least one axial cam and/or at least one axial cam groove so that a rotationally fixed but radially displaceable operative connection to the coupling disk can easily be established in the design.

It is advantageous if the coupling disk comprises an Oldham disk of the Oldham coupling and is therefore angularly true.

This object of the invention is also achieved by a device for processing materials, in particular a mechanical press or eccentric press with a drive for driving a tool, and the drive comprises a torque motor and a coupling and the device is characterized by a drive and/or a torque motor and/or coupling according to any one of the features described here.

If the device for processing materials and/or workpieces is/are equipped with the drive and/or torque motor and/or coupling described here, then this processing device may have a substantially more compact design.

This device may be a device for machines with a large drive shaft diameter, about >150 mm and with a high torque demand, about >1000 Nm such as connecting link presses and eccentric presses, rollers, calendars, crushers, rotor shafts and helical shafts.

The present processing device may preferably be designed as a device for shaping workpieces.

In addition, this object is also achieved by the use of a rotational body of a torque motor driving a shaft as a functional component of a coupling for compensating for radial movement between the torque motor and the shaft.

Due to the use of the rotational body of the torque motor as a functional component that is designed as a radial-movement compensating component of the coupling that is operatively connected to the torque motor, a drive in particular of a workpiece-shaping machine can be provided in a particularly compact design.

The radial-movement compensating component here is a first connection part of the coupling and/or of the connection that preferably has axial cams that engage in another connection part of the coupling and/or of the connection.

At any rate, in the sense of the present invention, the rotatable coupling part, the additional connection part and the coupling disk are equivalent.

The designs described above lead to an extremely compact and inexpensive design that can always be used when a torque motor in particular is to be coupled directly to a shaft and/or a working shaft in which an axle offset may occur and in which a free shaft end must be available for additional add-ons. Without an upstream connection of gears or the like, high torques are required in particular for a direct drive of connecting link drives and/or eccentric drives, for example, in forging presses. The dimensions of corresponding drive motors (rotor diameter and rotor length) are freely selectable within wide limits according to the demand for drive motor torque. The lateral surface of the rotor here is proportional to the motor torque. For a compact design, drive motors with a large rotor diameter and a small rotor length are advantageous.

The present invention is also characterized in particular in that even axle offsets occurring suddenly and the force peaks associated with them, usually also occurring suddenly can be absorbed, i.e. compensated out as is already the case on drive shafts of eccentric presses or the like.

It is self-evident that the features of the approaches described above and/or in the claims may optionally also be combined to be able to implement the advantages cumulatively accordingly.

Additional features, effects and advantages of the present invention will now be explained on the basis of the accompanying drawings and the following description, in which an arrangement according to the invention is illustrated and described as an example.

Components that correspond at least essentially with regard to their function in the individual figures may be identified here with the same reference numerals, but the components need not be identified with numbers and illustrated in all the figures.

SPECIFIC DESCRIPTION OF THE INVENTION

Figure 1:
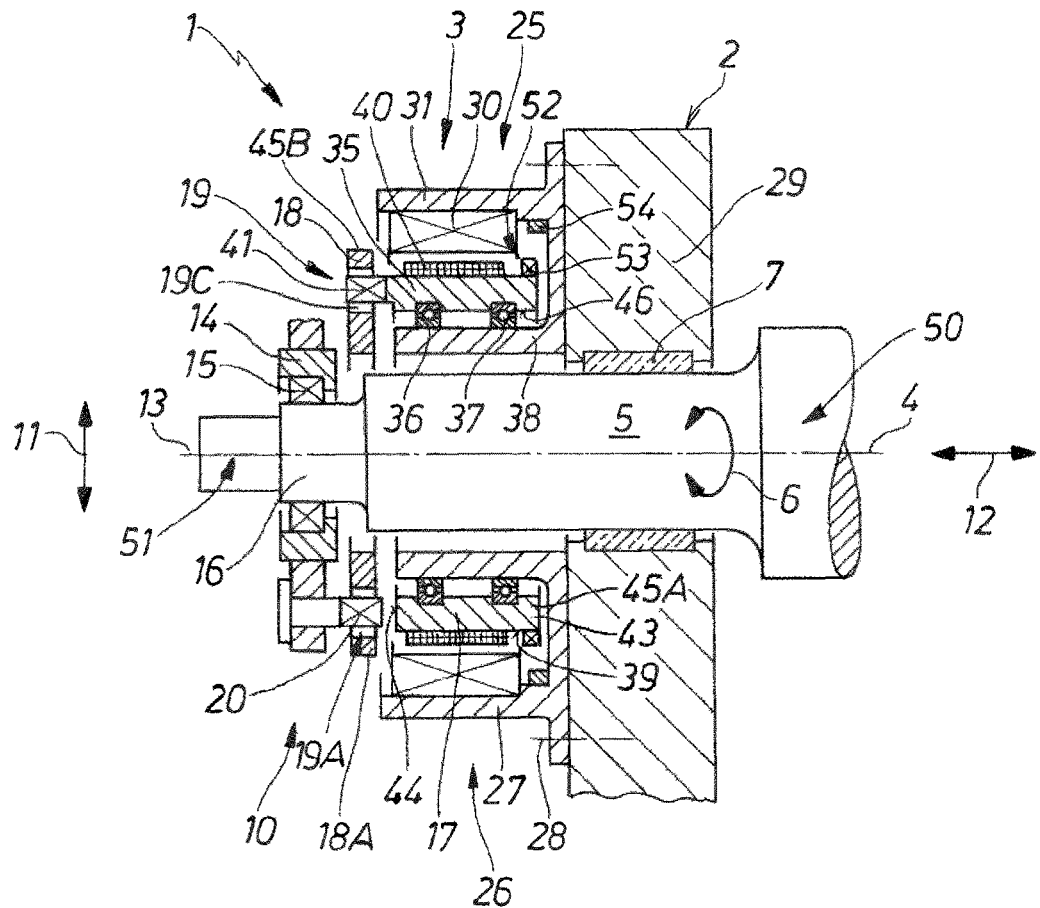
FIG. 1 is a schematic partial section of a connection between a drive motor and a coupling of the drive according to the invention.
Figure 2:
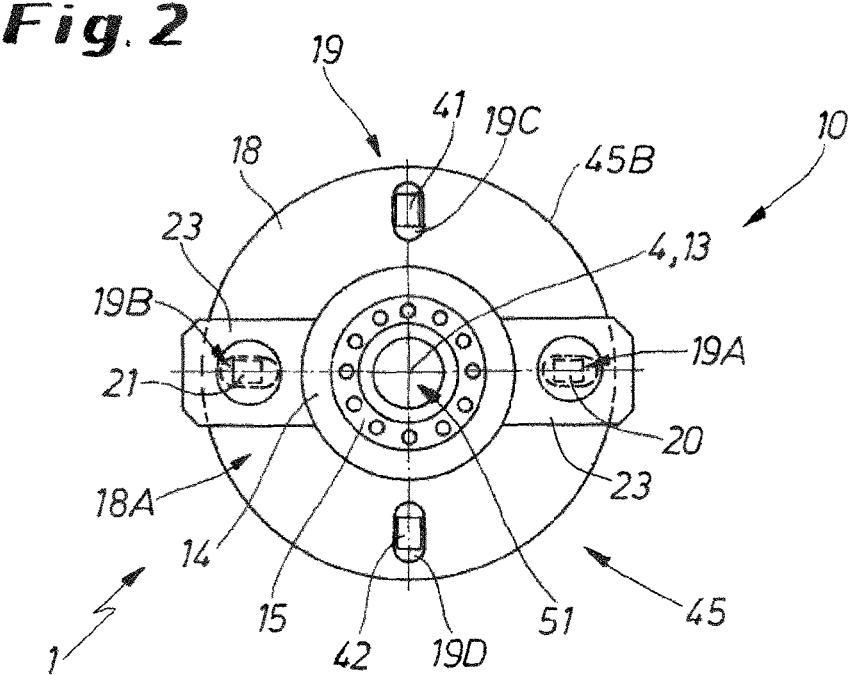
FIG. 2 is a schematic view of the coupling of the connection shown in FIG. 1.

The drive 1 shown partially in FIGS. 1 and 2 works with a machine 2 in this embodiment and has an electric drive motor 3 for rotating a shaft 5 of the machine 2, the shaft being rotatable about an axis 4 and serving to drive an unillustrated tool of the machine 2.

In addition, the drive 1 has a coupling 10 that operatively connects the electric drive motor 3 to the shaft 5 so that the shaft 5 can be rotated about the shaft rotation axis 4 in rotation directions 6.

The coupling 10 can in particular compensate for radial movement 11 between the shaft 5 and the electric drive motor 3, this radial movement 11 being relative to the shaft rotation axis 4 itself extending in an axial direction 12. This coupling 10 can therefore compensate in particular for wear-induced play of a slide bearing 7 of the rotary shaft 5.

The coupling 10 has a rotation axis 13 that is coaxial with the shaft rotation axis 4 at least with a shaft 5 that does not have radial play.

The coupling 10 here follows the design principle of an Oldham coupling that is already known in principle from the prior art.

To this end, the coupling 10 comprises a hub 14 that can rotate about the rotation axis 13 and is fixed in a hub seat 16 of the shaft 5 by a shaft-hub connector clamp 15.

In addition, the coupling 10 also has a coupling flange 17 that rotationally fixes the coupling 10 to the electric drive motor 3.

Furthermore, the coupling 10 has a coupling disk 18 formed with an array of connecting slots 19 (labeled with numbers only as an example).

Since the coupling 10 is designed essentially according to the design principle of an Oldham coupling, the coupling disk 18 therefore in the broadest sense also constitutes an Oldham coupling disk and is therefore angularly true.

The coupling disk 18 is a rotatable coupling part 18A here that can execute a radial movement 11.

The coupling hub 14 has two coupling lugs 20 and 21 diametrally opposite one another, engaging in respective connecting slots 19A and 19B of the connecting slots 19 of the coupling disk 18 so that the coupling hub 14 and the coupling disk 18 are connected to one another in a rotationally fixed manner in the rotation directions 6.

The two coupling lugs 20 and 21 diametrally opposite one another on the coupling hub 14 are fixed on two respective oppositely directed arms 23 (numbers included only as an example, see FIG. 2).

Thus the coupling hub 14 and the coupling disk 18 are connected to one another by a simple design in a rotationally fixed manner.

The electric drive motor 3 is an electrically operated torque-generating motor 25 in the form of a torque motor 26. The electric drive motor 3 has a housing 27 that secures it to a frame 29 of the machine 2 by suitable screws 28.

In addition, the electric drive motor 3 has a stator 30 rotationally fixed in an outer tubular part 31 of the housing 27 and thus also coaxially surrounding the rotation axis 13.

Furthermore, the electric drive motor 3 has a rotor 35 that is rotatably mounted on rotor bearing elements 36 and 37 in an inner tubular part 38 of the housing 27 and thus also coaxially surrounds the rotation axis 13. Permanent magnets 40 are carried on the outer surface 39 of the rotor 35 facing the stator 30.

The rotor 35 forms two coupling dogs 41 and 42 in the form of axial extension that project axially beyond an annular body 43 of the rotor 35, more specifically beyond a front axial end face 44 of the rotor 35 and that thus engage in two connecting slots 19C and 19D of the connecting slots 19 formed on the coupling disk 18.

The rotor 35 is thus arranged at least partially so that it engages in the rotatable coupling part 18A and the rotatable coupling part 18A is supported in a radially movable manner relative to the rotation axis 13 but is rotationally fixed to the rotor 35.

To this extent, the coupling flange 17 and the rotor 35 are identical.

These two connecting slots 19C and 19D are more elongated than the coupling dogs 41 and 42 and/or the axial cams of the rotor 35, and the longitudinal dimension of the two connecting slots 19C and 19D extends from radially further inward to radially further outward.

In this way, the coupling dogs 41 and 42 and/or the axial cams of the rotor 35 arranged in the two connecting slots 19C and 19D allow radial movement 11 of the coupling disk 18 with respect to the rotor 35, so that a radial shaft offset of the shaft 5 but also an axial shaft offset of the shaft 5 can be compensated with no problem.

The coupling disk 18 and the rotor 35 thus together form a connection 45 that supports the coupling disk 18 and the rotor 35 so that they are radially movable and rotationally fixed relative to one another.

To this extent, the rotor 35 and/or the coupling flange 17 in this illustrated embodiment form(s) a first connection part 45A of the connection 45, on which another connection part 45B is mounted in a radially displaceable manner, and this additional connection part 45B is the coupling disk 18.

At any rate, the coupling flange 17 has a bearing seat 46 of a roller bearing or slide bearing of the torque motor 25 that rotationally connects the coupling flange 17 to the housing 27 and/or inside the housing 27 of the torque motor 25.

It is especially advantageous that in the present case both the drive motor 3 and the coupling 10 are arranged around the shaft axis 4 in such a way that the two ends 50 and 51 of the shaft 5 are exposed, so that additional components or component groups (not shown) can be secured to the shaft 5.

For example, this would yield the possibility of arranging a rotary encoder (not shown) on the second shaft end 51. However, it is better to mount a rotary encoder 52 in this regard as a strip element 53 on the rotor 35 because, in this way, the rotary encoder 52 can be fixed on the rotor and the rotary encoder 52 is in direct proximity to a housing-mounted scanner 54. In this way, the drive motor 3 of the respective components such as the rotor-bound rotary encoder 52 and the housing-bound scanner 54 can be set up in close proximity to one another so that their interaction can be improved. In addition, this permits implementation of an even more compact design, in particular with respect to an electronic controller (not shown here) of the drive motor 3.

The machine 2 may be a device with an eccentric press where the shaft 5 is an eccentric shaft accordingly (not yet assigned a number) that drives a press tool, for example, directly or indirectly. A direct drive may be understood, for example, to mean that the tool is mounted directly on the axle. This is the case with a roller, for example. An indirect drive may be understood to mean that elements such as gears may be between the driven shaft and the tool, for example.

Figure 3:
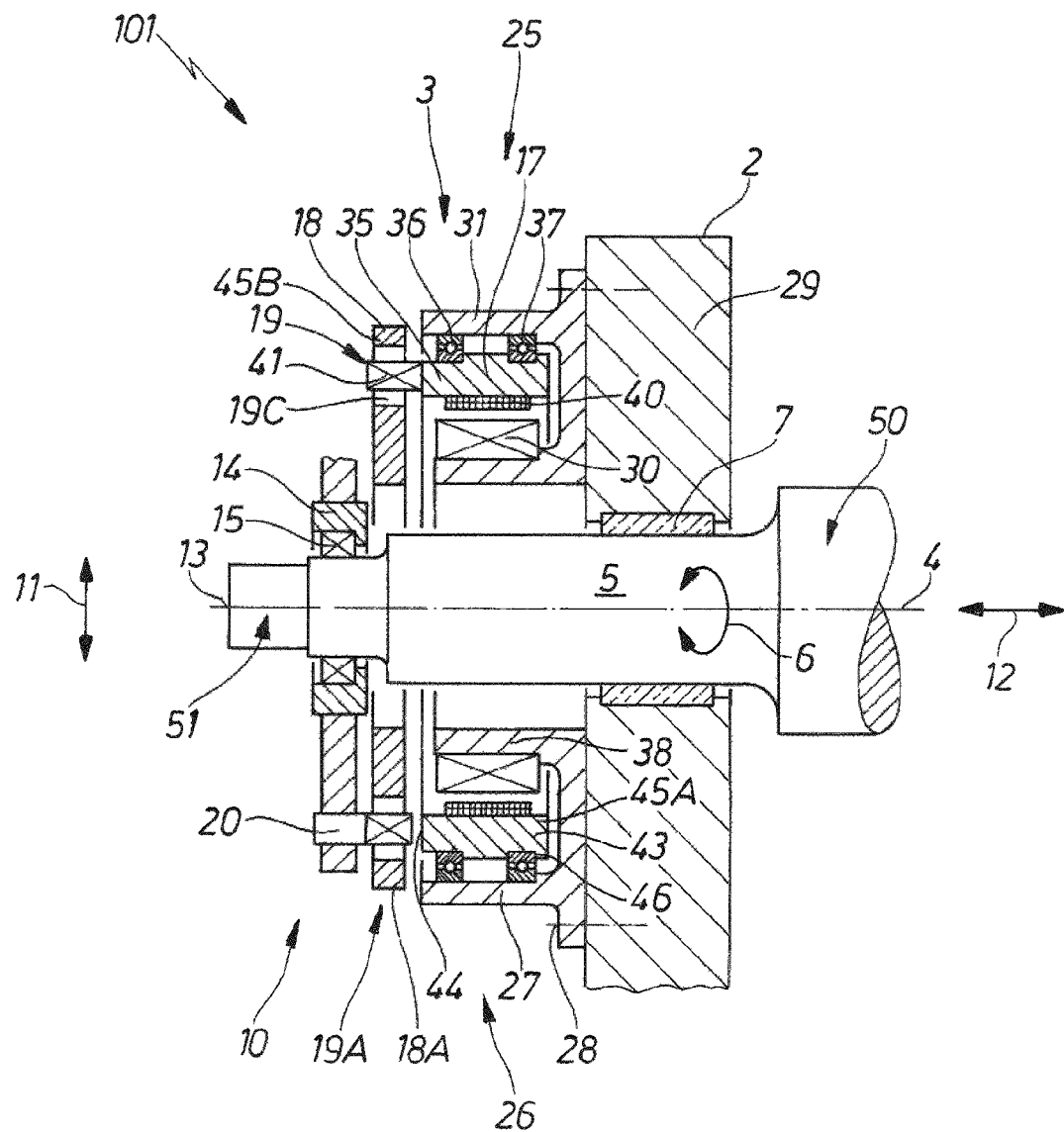
FIG. 3 is a schematic partial section of an alternative connection between a drive motor and a coupling of the drive according to the invention.

The additional drive 101 shown in FIG. 3 is essentially of the same design as the drive 1 shown in FIGS. 1 and 2. To this extent, the differences between the drives 1 and 101 are explained only briefly below while using the reference numerals. With regard to the design and functioning of the additional drive 101, reference is made to the preceding description to avoid repetition.

The additional drive 101 (FIG. 3) differs from the drive 1 (FIGS. 1 and 2) only in that the stator 30 is mounted on the outer tubular housing part 31 and a rotor 35 accordingly is mounted on the inner tubular housing part 38.

Figure 4:
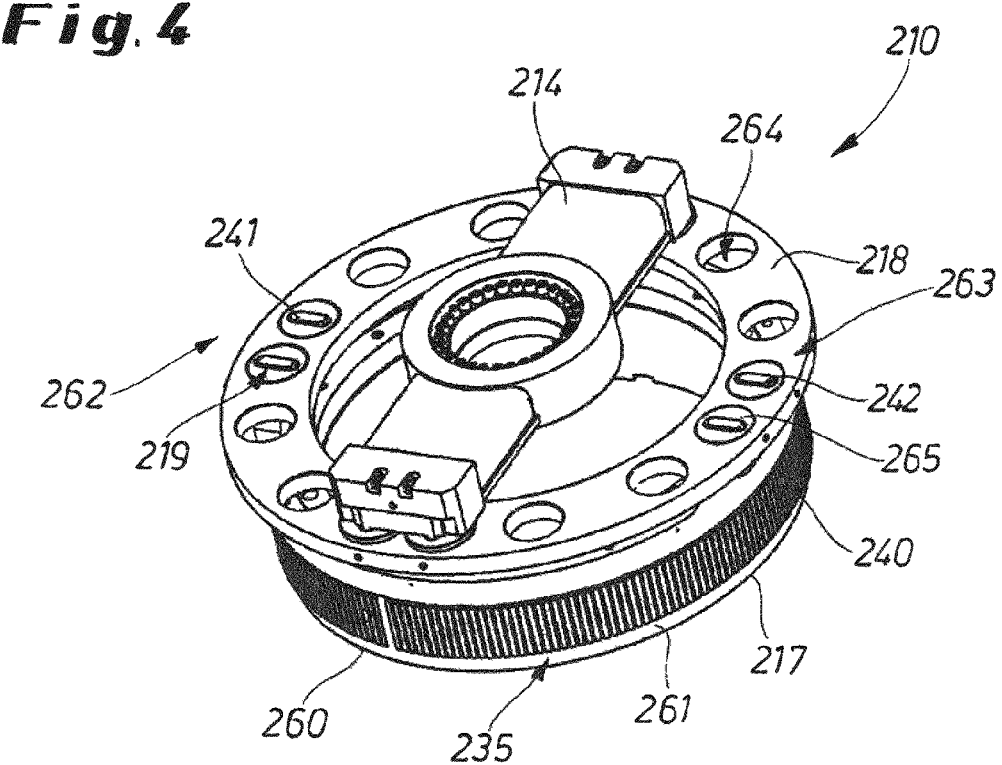
FIG. 4 is a schematic perspective view of a coupling for compensating for radial movement between a coupling hub and coupling flange where the coupling flange is a rotor of a drive motor.
Figure 5:
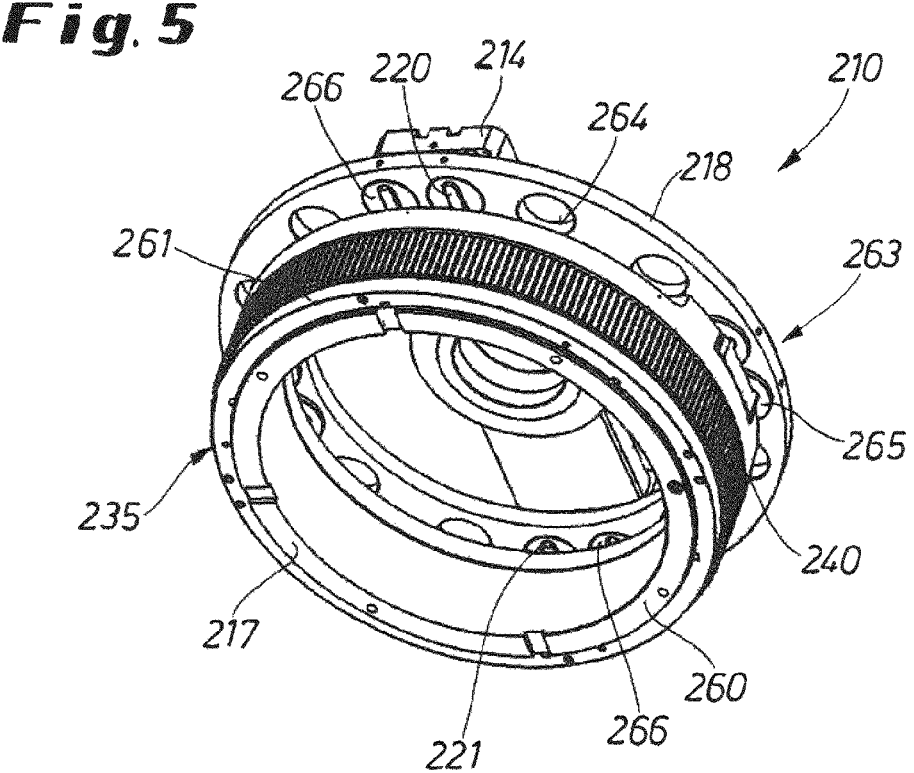
FIG. 5 is another schematic perspective view of the coupling shown in FIG. 4.

The additional coupling 210 shown in FIGS. 4 and 5 for operative connection of a drive motor of a drive to a shaft has a coupling hub 214, a coupling flange 217 and a coupling disk 218 displaceable radially with respect to the coupling flange 217, and the coupling flange 217 also forms a rotor 235 of the drive motor, so that this drive motor with its rotor 235 is an integral component of the coupling 210.

The rotor 235 and the thus also the coupling flange 217 have a rotor ring element 260, on whose side surface 261 a plurality of permanent magnets 240 are mounted, these permanent magnets interacting with the unillustrated stator of the drive motor.

The rotor 235 and/or the rotor ring element 260 in this regard has/have two cam pairs 262 and 263, each having two coupling dogs 241 and/or 242 (numbers shown only as an example). The two coupling dogs 241 and 242 each have a longitudinal dimension running parallel to one another so that on the whole radial movement is possible between the rotor ring element 260 and the coupling disk 218.

The coupling disk 218 has a plurality of circular material recesses 264 (number shown only as an example), in which suitably designed sliding bushings 265 are held as elongated connecting slots 219 at one end (numbers again shown only as an example), so that the coupling dogs 241 and/or 242 is/are mounted so that they are radially movable in these friction bushings 265. On the other hand, additional friction bushings 266 are held in these circular material recesses 264 supporting connecting link lugs 220 and/or 221 of the coupling hub 214.

At this point, it should be stated explicitly that the features of the approaches described above and/or in the claims and/or illustrated in the figures may optionally also be combined in order to be able to implement and/or achieve the features, effects and advantages described here in a cumulative manner accordingly.

It is self-evident that the illustrated embodiments explained above are only a first embodiment of the invention. To this extent, the embodiment of the invention is not limited to these illustrated embodiments.

All the features disclosed in the application documents are herewith claimed as essential to the invention if they are novel individually or in any combination in comparison with the prior art.

The invention claimed is:

1. A drive of a machine, the drive comprising:
a shaft rotatable about a shaft axis and having a pair of axially opposite ends;
a drive motor having a rotor surrounding the shaft between the ends and rotatable about a rotor rotation axis limitedly movable radially of the shaft, both of the ends being exposed past the drive motor; and
a coupling operatively connected to the drive motor and to the shaft between the motor and one of the ends for compensating for relative movement between the shaft and the drive motor, the coupling having a rotatable coupling part rotatable about the shaft rotation axis and movable radially relative to the shaft axis and rotor axis, the rotor at least partially engaging in the rotatable coupling part.

2. The drive according to claim 1, wherein the rotatable coupling part and the rotor together form a connection that carries the rotatable coupling part so that it is radially movable but rotationally fixed directly on the rotor.

3. The drive according to claim 2, wherein the rotor has at least one coupling dog engaging axially in a connecting slot formed in the rotatable coupling part.

4. The drive according to claim 3, wherein the at least one coupling dog projects axially beyond a front axial end face of the rotor.

5. The drive according to claim 3, wherein the at least one coupling dog is spaced radially from the shaft rotation axis.

6. The drive according to claim 1, wherein the rotatable coupling part is operatively connected to a coupling hub mounted on the shaft so that it is radially movable.

7. The drive according to claim 6, wherein the rotatable coupling part and the coupling hub are operatively connected to one another by coupling lugs engaging in connecting slots.

8. The drive according to claim 1, wherein the rotatable coupling part is an Oldham disk of an Oldham coupling.

9. The drive according to claim 8, further comprising:
a coupling hub with a coupling flange and displaceable radially with respect to the coupling flange and also radially displaceable with respect to the coupling flange, the coupling hub, the coupling flange and the coupling Oldham disk being operatively connected to one another in such a way that the coupling Oldham disk is displaceable radially with respect to the coupling flange, the coupling flange holding a rotor ring element of the rotor of a torque motor.

10. The drive according to claim 9, wherein the coupling flange forms a bearing seat of a roller bearing or slide bearing of the torque motor that secures the coupling flange rotatably on a housing of the torque motor.

11. The drive according to claim 9, wherein the coupling flange comprises at least one axial cam and/or at least one axial cam groove.

12. The drive according to claim 1, wherein the rotor comprises a first connection part of a connection of the coupling operatively connecting a torque motor and the shaft.

13. The drive according to claim 12, wherein the first connection part is a flange of the coupling.

14. The drive according to claim 12, wherein the rotor is unitarily formed with the first connection part.

15. The drive according to claim 12, wherein the first connection part comprises at least one axial cam or an axial cam groove.

16. The drive according to claim 12, further comprising:
an additional connection part that is radially displaceable with respect to the first connection part.

17. The drive according to claim 16, wherein the additional connection part comprises an Oldham disk of an Oldham coupling.

* * * * *